US007760638B2

(12) United States Patent
Shimonishi et al.

(10) Patent No.: US 7,760,638 B2
(45) Date of Patent: Jul. 20, 2010

(54) HIGH-THROUGHPUT COMMUNICATION SYSTEM, COMMUNICATION TERMINAL, SESSION RELAY, AND COMMUNICATION PROTOCOL

(75) Inventors: Hideyuki Shimonishi, Tokyo (JP); M. Yahya Sanadidi, Santa Monica, CA (US); Mario Gerla, Los Angeles, CA (US)

(73) Assignees: NEC Corporation, Tokyo (JP); Regents of the University of California, Oakland, CA (US)

( * ) Notice: Subject to any disclaimer, the term of this patent is extended or adjusted under 35 U.S.C. 154(b) by 1517 days.

(21) Appl. No.: 10/997,861

(22) Filed: Nov. 29, 2004

(65) Prior Publication Data

US 2006/0114830 A1 Jun. 1, 2006

(51) Int. Cl.
*H04L 12/26* (2006.01)
(52) U.S. Cl. .................................... 370/235; 709/235
(58) Field of Classification Search ................. 370/235, 370/252, 230, 232; 709/235
See application file for complete search history.

(56) References Cited

U.S. PATENT DOCUMENTS

| 5,193,151 | A * | 3/1993 | Jain ........................... 709/237 |
| 6,442,139 | B1 * | 8/2002 | Hosein ....................... 370/236 |
| 6,445,681 | B1 * | 9/2002 | Pogrebinsky ............... 370/252 |
| 7,088,677 | B1 * | 8/2006 | Burst, Jr. .................... 370/229 |
| 7,099,273 | B2 * | 8/2006 | Ha et al. ..................... 370/229 |
| 7,177,271 | B2 * | 2/2007 | Shao et al. .................. 370/229 |
| 7,239,611 | B2 * | 7/2007 | Khisti et al. ................ 370/230 |
| 7,369,498 | B1 * | 5/2008 | Ma et al. ..................... 370/235 |
| 2003/0030866 | A1 * | 2/2003 | Yoo ............................ 359/128 |
| 2004/0105463 | A1 * | 6/2004 | Cheung et al. .............. 370/468 |
| 2005/0237929 | A1 * | 10/2005 | Leith et al. .................. 370/229 |

FOREIGN PATENT DOCUMENTS

| JP | H11-243419 A | 9/1999 |
| JP | 2000-253096 A | 9/2000 |
| JP | 2004-032218 A | 1/2004 |
| JP | 2004-080413 A | 3/2004 |

OTHER PUBLICATIONS

W. Stevens, "TCP Slow Start, Congestion Avoidance, Fast Retransmit, and Fast Algorithms", RFC 2001, Jan. 1997, pp. 1-6.
Saverio Mascolo et al., TCP Westwood: Bandwidth Estimation for Enhanced Transport Over Wireless Links, Proceedings in Mobicom 2001, pp. 287-297.
Ren Wang et al., Efficiency/Friendliness Tradeoffs in TCP Westwood, Seventh IEEE Symposium On Computers and Communications, 2003, pp. 1-20.

* cited by examiner

*Primary Examiner*—William Trost, IV
*Assistant Examiner*—Roberta A Shand
(74) *Attorney, Agent, or Firm*—Sughrue Mion, PLLC (57) ABSTRACT

In a communication system for transmitting and receiving data between a plurality of terminals via a network through a session relay for relaying communication between the terminals, each of the terminals or the session relay measures a one-way or a round-trip delay time in the network, determines a threshold delay time at which network congestion is judged. With reference to a delay time upon detection of packet loss and the threshold delay time, estimation is made about the possibility that the packet loss results from congestion. A congestion window is changed with reference to the possibility upon detection of the packet loss.

9 Claims, 6 Drawing Sheets

HIGH-THROUGHPUT COMMUNICATION SYSTEM, COMMUNICATION TERMINAL, SESSION RELAY, AND COMMUNICATION PROTOCOL

BACKGROUND OF THE INVENTION

This invention relates to a communication system, a communication terminal, a session relay, and a communication protocol and, in particular, to a communication system, a communication terminal, a session relay, and a communication protocol, each of which is capable of maintaining high throughput even if a packet loss is frequently caused to occur.

TCP (Transmission Control Protocol) is known as a protocol that is most frequently used in a fourth-layer protocol for data communication over the internet. By the use of the TCP, it is possible to realize reliable communication between a transmitting terminal and a receiving terminal without loss of data along a communication path. The TCP provides a congestion control function of appropriately controlling a congestion window depending upon a congestion condition of a network. If no congestion occurs in the network, the congestion window is given a large size to increase a transmission bandwidth. If congestion occurs in the network, the congestion window is given a small size to decrease the transmission bandwidth.

Practically, the TCP has a wide variety of versions. Among others, TCP-Reno is most widely used (see W. Stevens, "TCP Slow Start, Congestion Avoidance, Fast Retransmit, and Fast Recovery Algorithms," RFC2001, January 1997). In the TCP-Reno, upon detection of packet loss, it is judged that the network is congested. Then, the congestion window is halved or reduced to a half to decrease the transmission bandwidth. On the other hand, if no packet loss is detected, it is judged that the network is not congested. Then, the congestion window is linearly increased.

The TCP-Reno is disadvantageous in that high throughput is not achieved, in particular, in a radio channel if packet loss or discard occurs due to a cause other than the congestion. For example, it is assumed that packet loss occurs due to an error on a radio channel. In this event, even if no congestion actually occurs, the TCP-Reno judges occurrence of congestion and, in consequence, reduces the congestion window. In order to deal with packet loss due to the cause other than the congestion, proposal has been made of the following techniques.

In a first conventional technique, upon occurrence of packet loss, a network supplies each terminal with some information about whether or not the packet loss results from congestion. Japanese Patent Application Publication (JP-A) No. 2004-80413 discloses a method in which a receiving terminal transmits ELN (Explicit Loss Notification) information to a transmitting terminal upon occurrence of packet loss due to an error in a radio channel. The transmitting terminal reduces the congestion window only when the packet loss stems from the congestion. Japanese Patent Application Publication (JP-A) No. H11-243419 discloses a similar method. Japanese Patent Application Publication (JP-A) No. 2000-253096 discloses a method in which the transmitting terminal is informed of a quality of the radio channel and, if the quality of the radio channel is inferior, the congestion window is controlled by a control scheme adapted to the radio channel.

In a second conventional technique, upon occurrence of packet loss, the congestion window is changed irrespective of whether or not the packet loss is due to congestion. In this case, the congestion window is not simply reduced to a half but is given an appropriate value depending upon a situation. In Japanese Patent Application Publication (JP-A) No. 2004-32218 or an article by C. Casetti et al "TCP Westwood: Bandwidth Estimation for Enhanced Transport over Wireless Links" in Proceedings of Mobicom 2001, a method is disclosed wherein a bandwidth available to a TCP session is continuously measured during transmission. Upon occurrence of packet loss, the congestion window is updated to an optimum value with reference to the available bandwidth. In such a method, if the packet loss occurs due to an error in the radio channel, the congestion window is not simply halved but is updated to an optimum value. It is therefore possible to avoid a decrease in throughput due to the packet loss.

However, the above-mentioned first conventional technique has a shortcoming in difficulty of provision because a mechanism is needed to transmit, from the network to each terminal, the cause of the packet loss and the condition of the radio channel. In particular, in case where a terminal connected to the radio channel communicates with an unspecified number of terminals which are not connected to the radio channel, it is not difficult to introduce the above-mentioned mechanism to the terminal connected to the radio channel but it is not easy to introduce the above-mentioned mechanism to all of the terminals which are not connected to the radio channel. In case where packet loss occurs due to an error in an ordinary wired channel, it is not easy to introduce the above-mentioned mechanism to all such wired channels.

The second conventional technique makes it difficult to coexist with both a proposed session and an existing TCP session both of which share the network. Specifically, when the TCP session uses the second conventional technique, the congestion window is updated in a manner different from that of the existing TCP session even if the packet loss results from the congestion. Therefore, if such different TCP sessions coexist with each other in the network and, in particular, if the packet loss is mostly based on the congestion, only the existing TCP session achieves high throughput or, to the contrary, is significantly reduced in throughput.

SUMMARY OF THE INVENTION

It is therefore an object of this invention to provide a communication system that is capable of achieving high throughput simply by protocol processing at a terminal without requiring a mechanism for sending, from a network to a terminal, information about a cause of packet loss and a quality of a radio channel.

It is another object of this invention to provide a communication system which allows coexistence of a newly-introduced TCP session and an existing TCP session in a single network by fairly sharing a bandwidth between these TCP sessions.

It is still another object of this invention to provide a terminal and a session relay both of which are effectively used in the communication system.

According to this invention, there is provided a communication system including a plurality of terminals and a session relay for relaying communication between the terminals, wherein each of the terminals or the session relay has means for measuring a one-way or a round-trip delay time in a network, means for determining a threshold delay time at which network congestion is judged, and means for estimating, with reference to a delay time upon detection of packet loss and the threshold delay time, the possibility that the packet loss is due to congestion. Upon detection of the packet loss, a congestion window is changed with reference to the above-mentioned possibility. Therefore, it is unnecessary to provide a mechanism for informing, from the network to the terminal, information about a cause of packet loss and a quality of a radio channel. If the packet loss is due to congestion, the congestion window may be changed in the manner similar to an existing TCP session.

With the communication system, the terminals, and the session relay, the following effect is achieved.

First, high throughput is achieved simply by protocol processing at a terminal without requiring a mechanism for sending, from the network to the terminal, information about a cause of packet loss and a quality of a radio channel. It is easy to introduce a mechanism for improving the throughput.

Second, upon occurrence of contention between a newly-introduced TCP session and an existing TCP session, a bandwidth is fairly shared therebetween. Therefore, these TCP sessions can coexist in a single network without any problem.

DESCRIPTION OF THE PREFERRED EMBODIMENTS

Now, description will be made of several preferred embodiments of this invention with reference to the drawing.

First Embodiment

Figure 1:
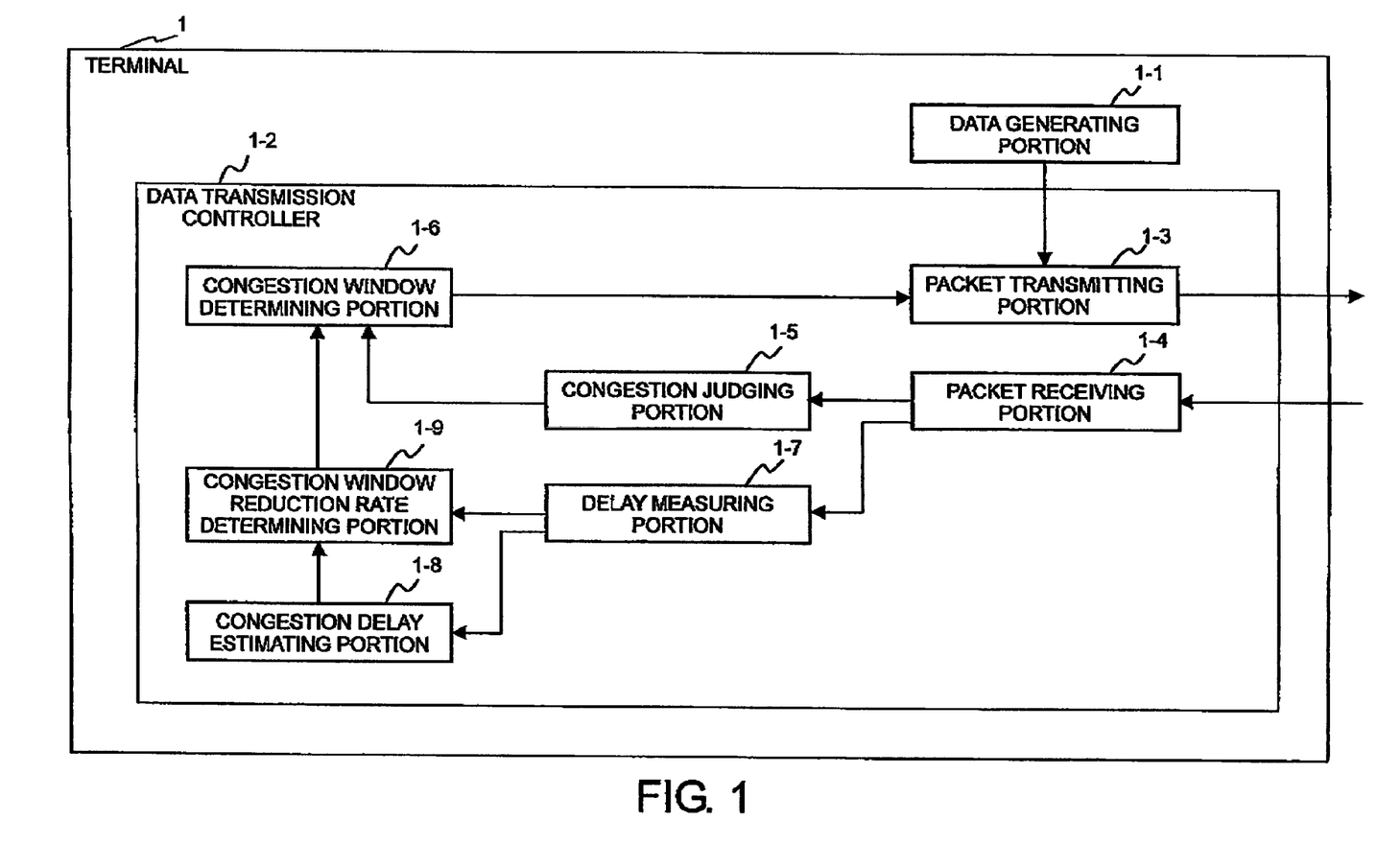
FIG. 1 is a block diagram of a terminal according to a first embodiment of this invention.

Referring to FIG. 1, a terminal 1 comprises a data generator 1-1 for generating transmission data and a data transmission controller 12 for delivering the transmission data to a network.

The data transmission controller 1-2 comprises a packet transmitting portion 1-3 for transmitting packets to the network, a packet receiving portion 1-4 for receiving packets from the network, a congestion judging portion 1-5 for judging occurrence of congestion from presence or absence of packet loss, a congestion window determining portion 1-6 for increasing or decreasing a congestion window, a delay measuring portion 1-7 for measuring a queue delay in the network, a congestion delay estimating portion 1-8 for determining a threshold queue delay at which congestion is to be judged, and a congestion window reduction rate determining portion 1-9 for estimating the possibility that the packet loss is due to congestion and for determining a reduction rate of the congestion window.

Figure 2:
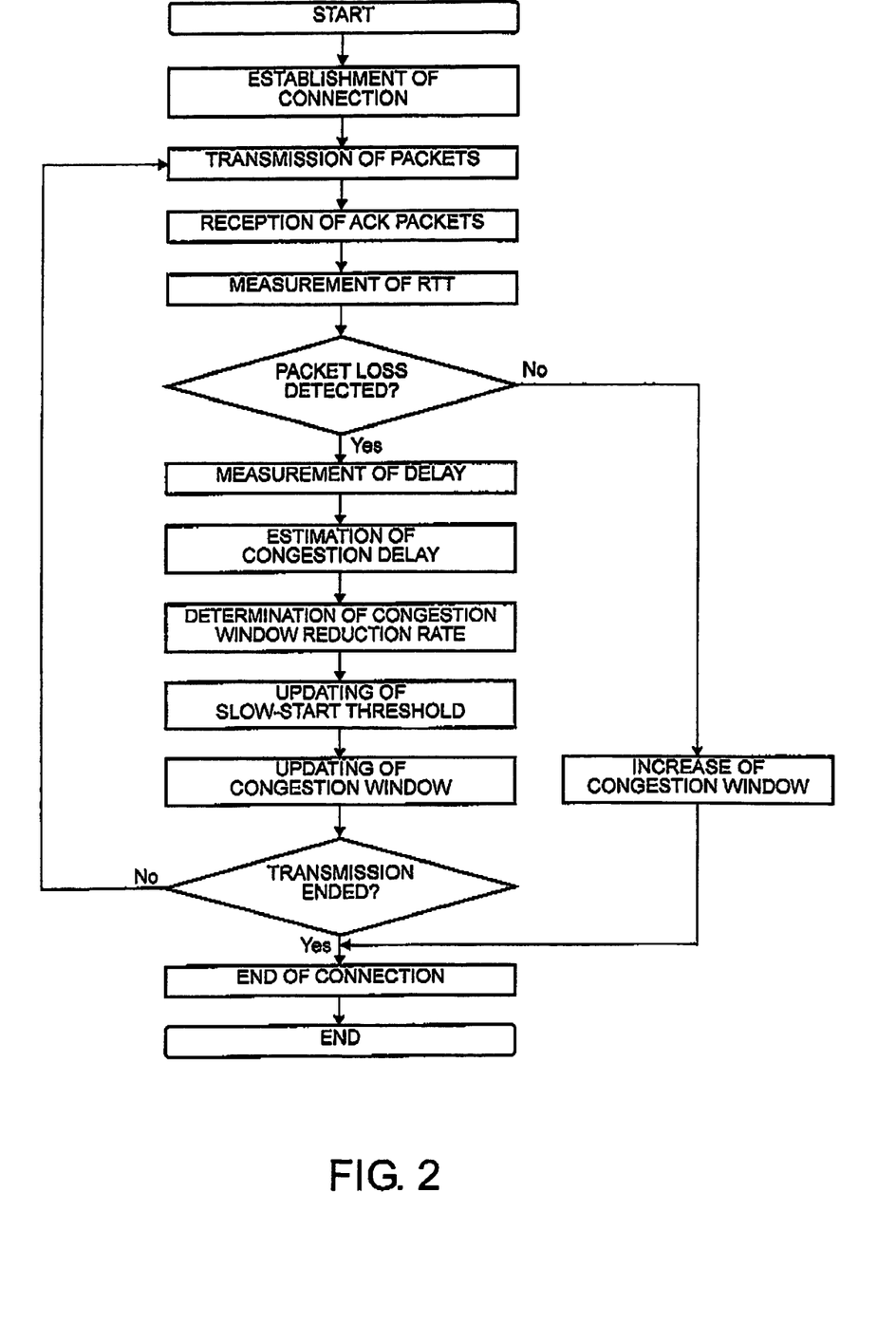
FIG. 2 is a flow chart showing an operation of the first embodiment.

Referring to FIG. 2 in addition to FIG. 1, an operation of the first embodiment will be described.

When the data generator 1-1 generates the transmission data, a TCP connection is established between a transmitting terminal 1 and a receiving terminal and data transmission is started. In the illustrated example, it is assumed that the illustrated terminal 1 can be used as either the transmitting terminal or the receiving terminal. In accordance with a current value of the congestion window, the packet transmitting portion 1-3 packetizes the transmission data into transmission packets and delivers the transmission packets to the network. At this time, if the congestion window has a large value, a greater number of transmission packets can be delivered to the network at one time so that high throughput is achieved. On the other hand, if the congestion window has a small value, the throughput is lowered.

When the terminal 1 transmits the transmission packets to the receiving terminal, the receiving terminal sends acknowledgement packets (ACK packets) back to the terminal 1 in response to the transmission packets. The packet receiving portion 1-4 receives the ACK packets. The congestion judging portion 1-5 confirms whether or not the ACK packets are properly received in response to the transmission packets and, if properly received, judges that no congestion occurs. On the other hand, if the ACK packets are not properly received in response to the transmission packets, the congestion judging portion 1-5 judges occurrence of packet loss. If no congestion occurs, the congestion window determining portion 1-6 judges that the throughput can be increased, and increases the congestion window. On the other hand, upon occurrence of the packet loss, the congestion window determining portion 1-6 determines a reduction rate of the congestion window with reference to a result of judgment about whether or not the packet loss is due to congestion and adjusts the congestion window in the manner which will be described in the following.

Upon occurrence of the packet loss, the delay measuring portion 1-7 measures a delay time upon detection of the packet loss. The delay measuring portion 1-7 continuously measures a round-trip delay time (RTT). A minimum RTT may be understood as a round-trip propagation delay in the network. Therefore, by subtracting the minimum RTT from the RTT upon detection of the packet loss, the delay time upon detection of the packet loss can be measured.

Next, by statistically processing delay times previously measured upon detection of packet loss, the congestion delay estimating portion 1-6 determines a threshold delay time at which congestion is to be judged. For example, an average is calculated over those delay times upon detection of packet loss which are not lower than a predetermined lower limit. The average is used as the threshold delay time. Alternatively, distribution of the delay times upon detection of packet loss is prepared and a particular delay time of a highest distribution frequency or density is used as the threshold delay time.

The congestion window reduction rate determining portion 1-9 compares the delay time upon detection of packet loss and the threshold delay time at which the congestion is judged, and determines the reduction rate of the congestion window. Herein, if the above-mentioned delay time is greater than the threshold delay time, the reduction rate of the congestion window is set to 50%, judging that the packet loss is due to the congestion. On the other hand, as the delay time becomes smaller below the threshold delay time, it is judged that the packet loss results from a cause other than the congestion at a higher possibility. In this event, the reduction rate of the congestion window is gradually increased (therefore, a reduction range of the congestion window is decreased). For example, the reduction rate of the congestion window is determined as follows.

Congestion Window Reduction Rate=Threshold/ (Threshold+Delay Time)

Finally, the congestion window determining portion 1-6 determines a slow-start threshold and the value of the congestion window as follows upon detection of packet loss.

Slow-Start Threshold=Congestion Window×Congestion Window Reduction Rate Congestion Window=Slow-Start Threshold In this embodiment, upon detection of packet loss, it is judged whether or not the packet loss is due to the congestion and the congestion window is reset. Therefore, it is possible to improve the throughput in the situation where the packet loss occurs due to a cause other than the congestion and a link utilization rate is low. On the other hand, if the link utilization rate is sufficiently high and the packet loss is mostly due to the congestion, the bandwidth is fairly shared with an existing TCP session having a same bottleneck in common without unnecessarily improving the throughput.

Second Embodiment

Figure 3:
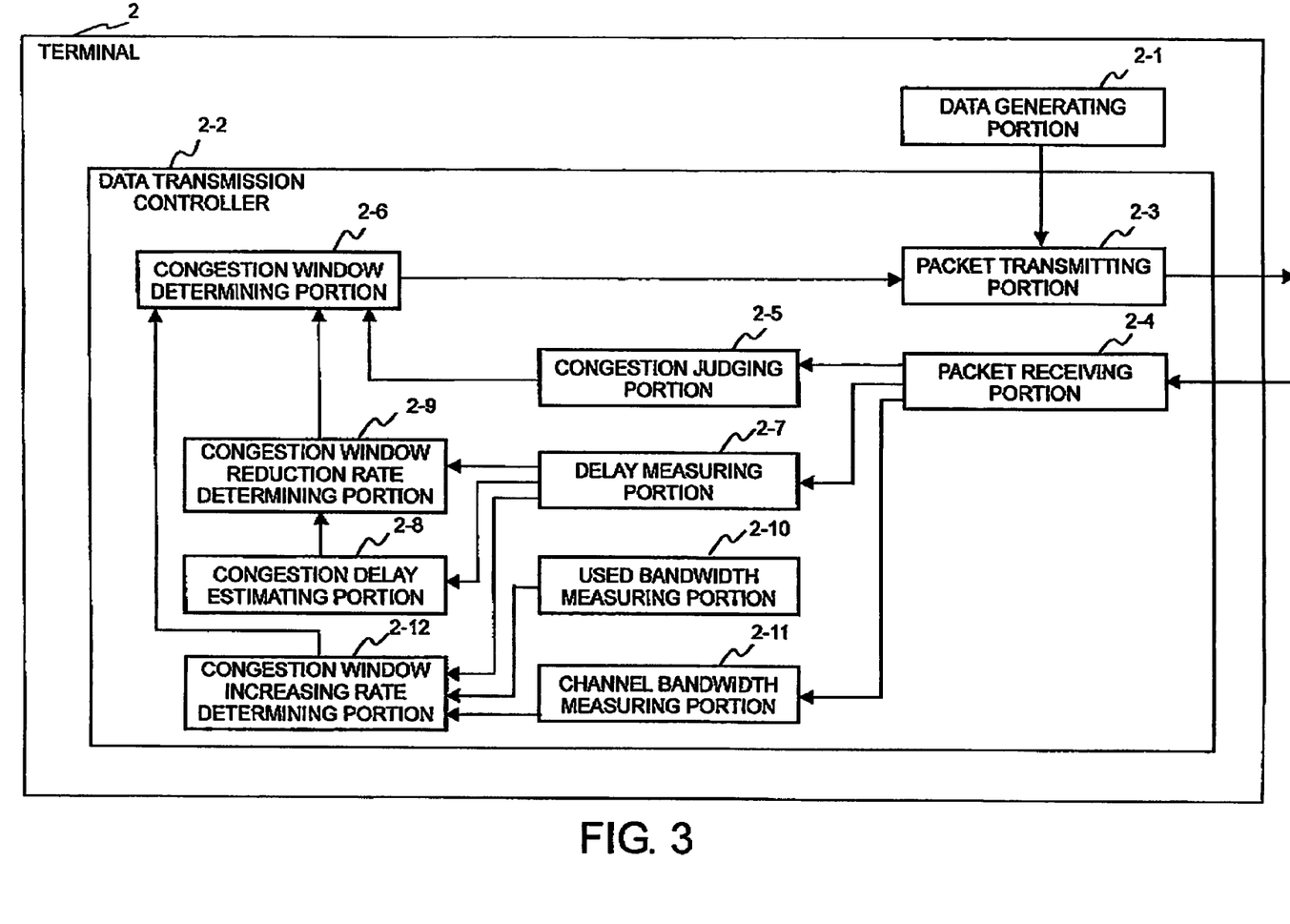
FIG. 3 is a block diagram of a terminal according to a second embodiment of this invention.

Referring to FIG. 3, a terminal 2 according to a second embodiment of this invention comprises a data generator 2-1 for generating transmission data and a data transmission controller 2-2 for delivering the transmission data to the network.

The data transmission controller 2-2 comprises, in addition to the structure of the data transmission controller 1-2 of the first embodiment illustrated in FIG. 1, a used bandwidth measuring portion 2-10 for measuring a bandwidth currently used by a TCP session, a channel bandwidth measuring portion 2-11 for measuring a bandwidth of a channel having a smallest bandwidth along a path, and a congestion window increasing rate determining portion 2-12 for increasing the congestion window if the packet loss is detected when the channel or link utilization rate is low. In other words, any other portions 2-3 to 2-9 than 2-10, 2-11, and 2-12 in FIG. 3 are similar in structure and operation to the portions 1-3 to 1-9 illustrated in FIG. 1, respectively.

Figure 4:
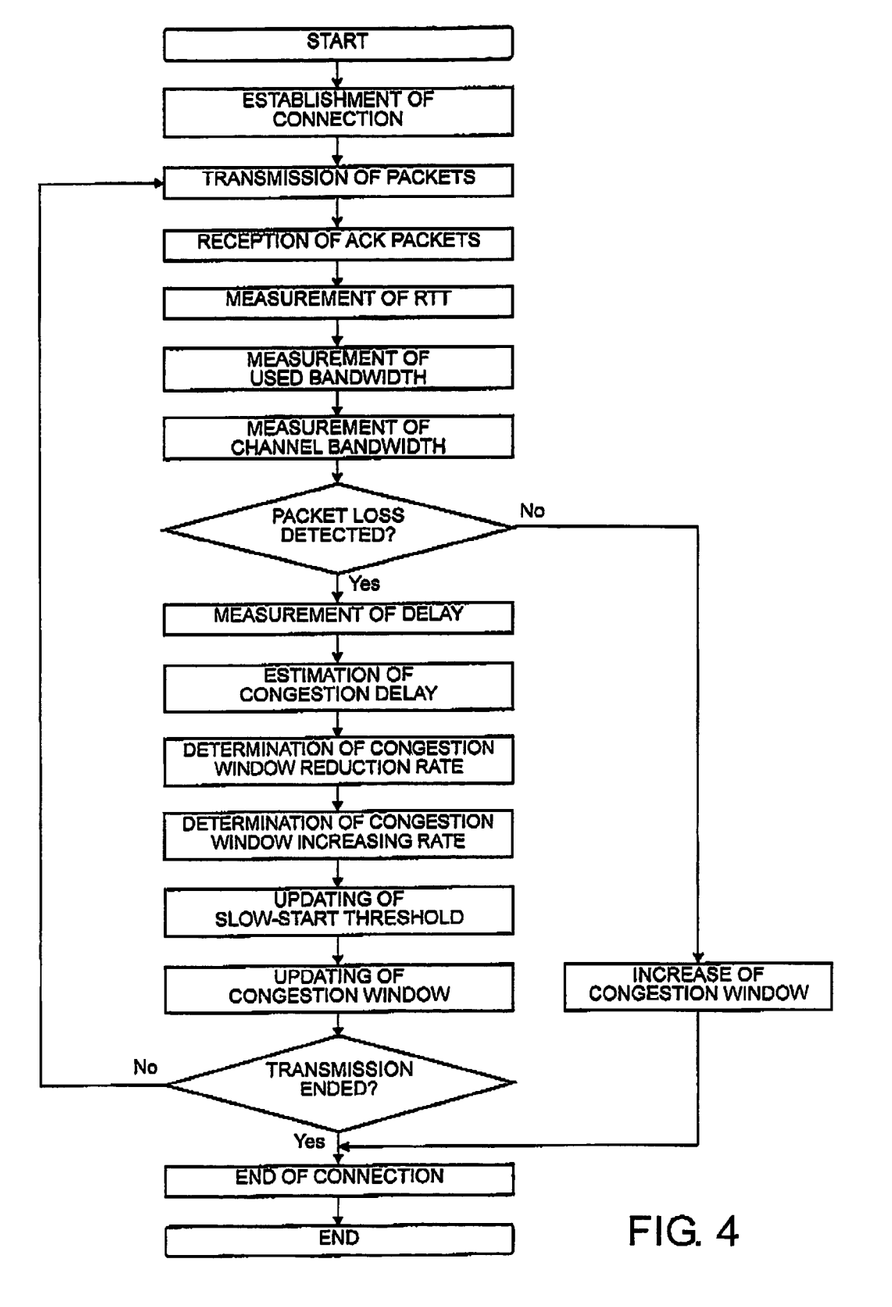
FIG. 4 is a flow chart showing an operation of the second embodiment.

Referring to FIG. 4 in addition to FIG. 3, an operation of the second embodiment will be described.

The operation of the second embodiment is substantially similar to that of the first embodiment except a part upon detection of packet loss. Similar parts of operation will not be described herein, in this embodiment, upon reception of the ACK packets, measurement is made not only about the RTT but also about both the used bandwidth used by the TCP session and the bandwidth of the channel having the smallest bandwidth along the path. Herein, the used bandwidth may be obtained by dividing the value of the congestion window by the RTT or may be obtained from the amount of data certainly received within a predetermined time period. The channel bandwidth may be obtained by the use of two ACK packets which have consecutively arrived at first and second time instants. Specifically, the amount of acknowledged received data is divided by a time interval between the first and the second time instants to obtain a result of division as the channel bandwidth. Such calculation of the bandwidth is described in detail in an article contributed by R. Wang at al "Efficiency/Friendliness Tradeoffs in TCP Westwood" to Seventh IEEE Symposium on Computers and Communications, 2003 and is not described in detail herein.

Upon detection of packet loss, the reduction rate of the congestion window is at first determined by the use of the delay measuring portion 2-7, the congestion delay estimating portion 2-8, and the congestion window reduction rate determining portion 2-9 all of which are operated in the manner mentioned in conjunction with the portions 1-7, 1-8, and 1-9 of the first embodiment illustrated in FIG. 1.

Now, description will be made about an algorithm or protocol used in the first embodiment.

In this embodiment, if the delay time is very short on occurrence of packet loss, as compared with the threshold delay time at which congestion is judged, the channel utilization rate is judged very low. The resultant processing is carried out to increase the congestion window upon occurrence of packet loss. Specifically, the congestion window increasing rate determining portion 2-12 increases a congestion window increasing rate to (Channel Bandwidth/Used Bandwidth) so as to increase the throughput to the channel bandwidth. As the delay time upon occurrence of packet loss becomes longer, the congestion window increasing rate is gradually close to 1. Thus, in case where the channel utilization rate is not low, the congestion window is not unnecessarily increased. For example, the congestion window increasing rate is determined as follows.

$$U=1/(e^{\alpha*Delay\ Time/Threshold})$$

Congestion Window Increasing Rate=$(1-U)*1+U*$ (Channel Bandwidth/Used Bandwidth)

Herein, U represents a variable indicating that the channel utilization rate is very low and α represents a constant determined so that U gradually approaches 0 when the delay time is close to the threshold delay time. In the above equations, when the channel utilization rate is low, U is equal to 1 and the congestion window increasing rate is equal to (Channel Bandwidth/Used Bandwidth). On the other hand, when the channel utilization rate is high, U is equal to 0 and the congestion window increasing rate is equal to 1.

Finally, upon detection of packet loss, the congestion window determining portion 2-6 determines a slow-start threshold in the following manner.

Slow-Start Threshold=Congestion Window×Congestion Window Reducing Rate×Congestion Window Increasing Rate If the slow-start threshold is smaller than the congestion window:

Congestion Window=Slow-Start Threshold

This embodiment exhibits an effect similar to that of the first embodiment. In this embodiment, if the packet loss rate is high and the channel utilization rate is very low, the congestion window is increased upon occurrence of packet loss. With this structure, the throughput is further improved.

Third Embodiment

Figure 5:
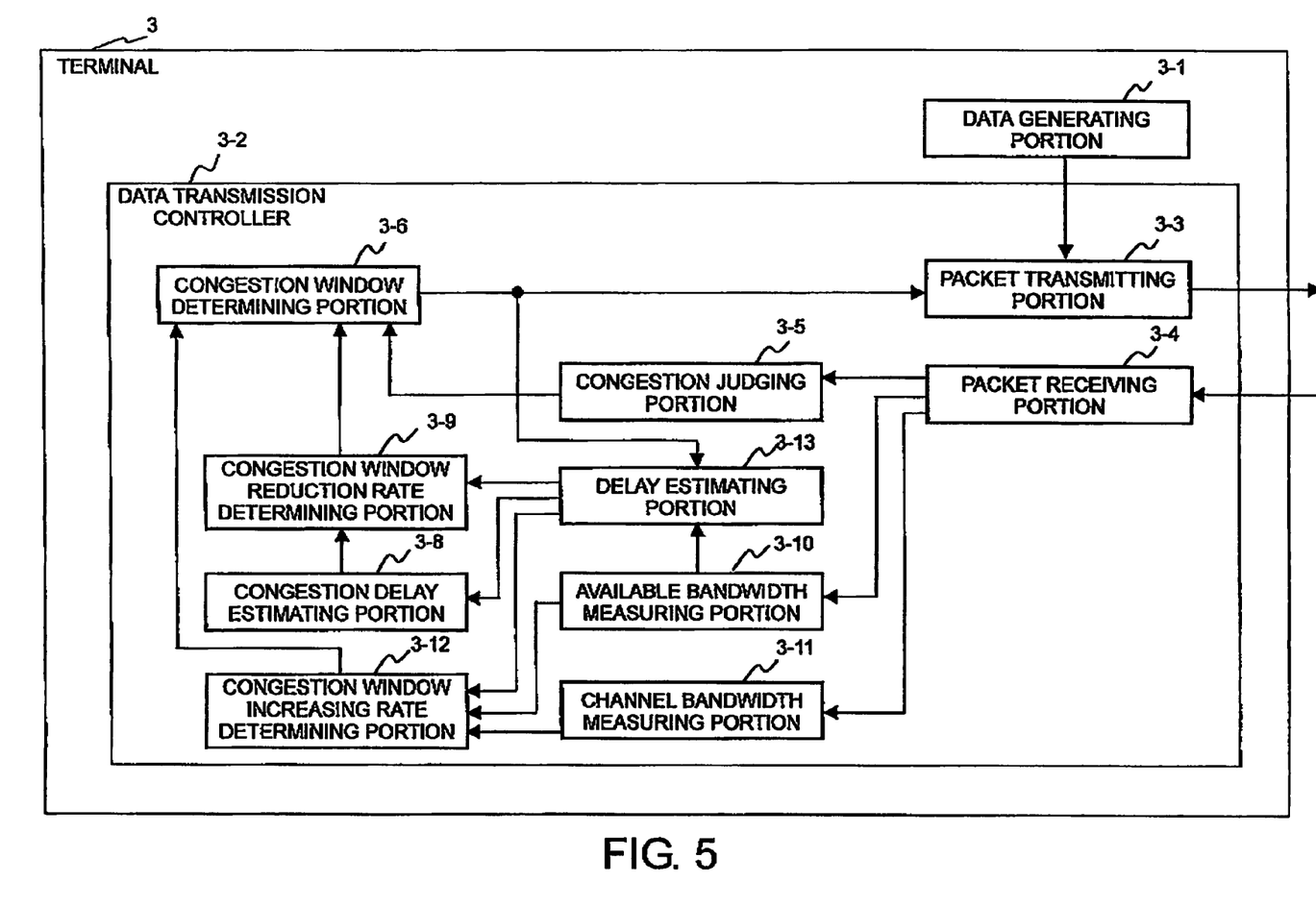
FIG. 5 is a block diagram of a terminal according to a third embodiment of this invention.

Referring to FIG. 5, a terminal 3 according to a third embodiment of this invention comprises a date generator 3-1 for generating transmission data and a data transmission controller 3-2 for delivering the transmission data to the network.

The data transmission controller 3-2 is similar to the data transmission controller 2-2 in the second embodiment except that the delay measuring portion 2-7 is replaced by a delay estimating portion 3-13, although the remaining portions 3-3 to 3-12 are represented by the numerals 2-3 to 2-12 different from FIG. 3, respectively.

An operation of the third embodiment is different in operation from the second embodiment in the following respect.

In the second embodiment, the delay measuring portion 2-7 measures the RTT. On the other hand, in the third embodiment, the delay estimating portion 3-13 produces an estimated RTT by the use of an available bandwidth measured by an available bandwidth measuring portion 3-10. Specifically, the estimated RTT is obtained by dividing a current value of the congestion window by the available bandwidth.

The third embodiment is essentially similar to the second embodiment and exhibits an effect similar to that of the second embodiment. However, in the third embodiment, the RTT is not actually measured but is estimated. Therefore, this embodiment is also applicable even if the RTT can not correctly be measured because a packet is retransmitted in a lower layer as in the radio channel.

Fourth Embodiment

Figure 6:
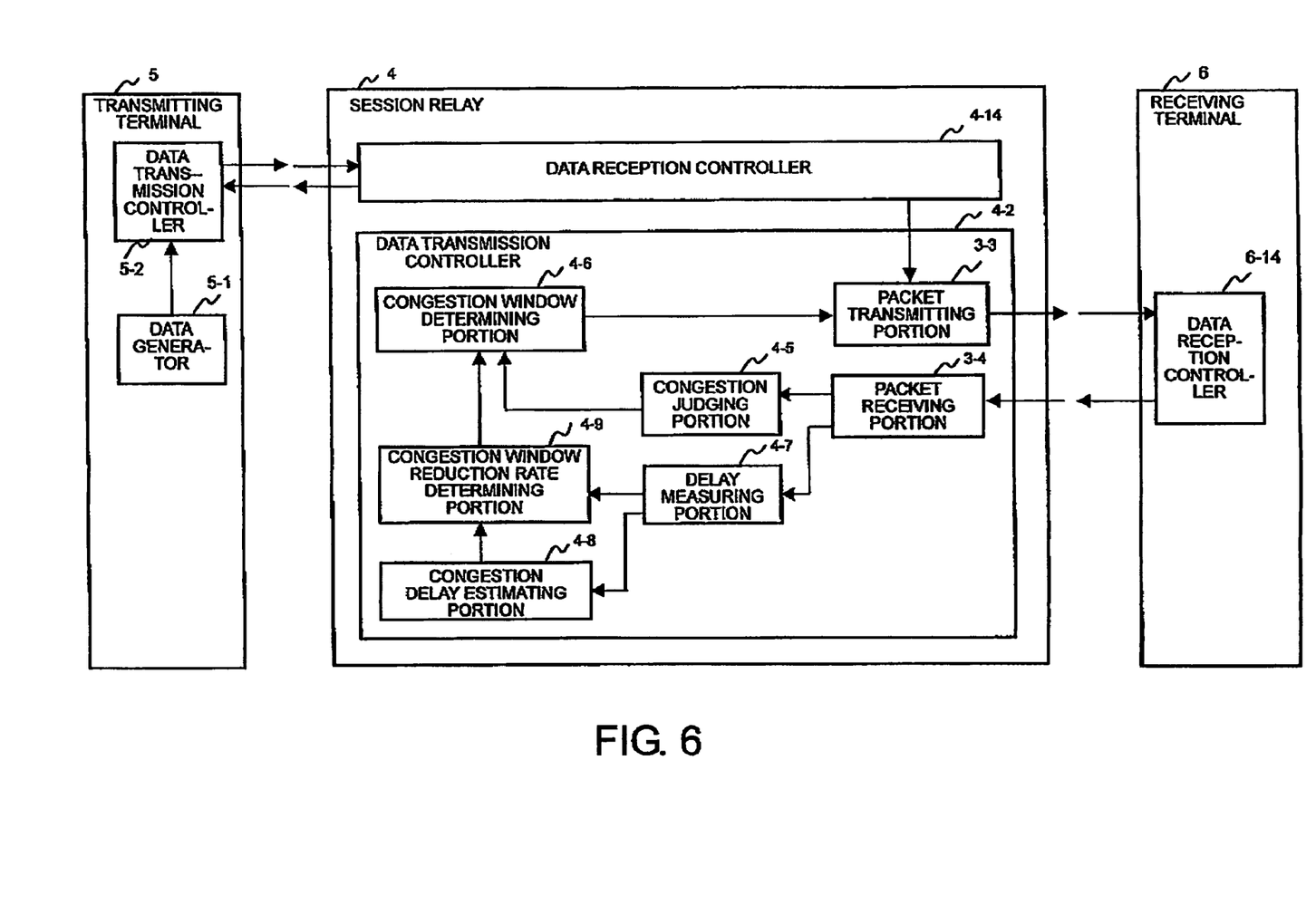
FIG. 6 is a block diagram of a session relay and a communication system using the session relay according to a fourth embodiment of this invention.

Referring to FIG. 6, description will be made as a fourth embodiment of this invention about a session relay and a communication system using the same.

The illustrated communication system comprises a transmitting terminal 5, a receiving terminal 6, and the session relay 4 for relaying communication between the transmitting and the receiving terminals 5 and 6. In the fourth embodiment, communication between the transmitting terminal 5 and the receiving terminal 6 is not directly carried out by a single TCP session but is carried out via the session relay 4 by the use of two TCP sessions, i.e., a TCP session from the transmitting terminal 5 to the session delay 4 and another TCP session from the session relay 4 to the receiving terminal 6. The session relay 4 carries out data relay processing between these TCP sessions.

The transmitting terminal 5 comprises a data generator 5-1 for generating transmission data and a data transmission controller 5-2 for delivering the transmission data to the network. The data transmission controller 5-2 may be the data transmission controller in this invention or a data transmission controller known in the art. The receiving terminal 6 comprises a data reception controller 6-14 which is supplied with packets transmitted from the transmission controller 5-2 and extracts the data from the packets. The data reception controller 6-14 has a structure similar to a typical structure in TCP communication.

The session relay 4 comprises a data reception controller 4-14 and a data transmission controller 4-2. The data reception controller 4-14 has a structure similar to a typical structure in TCP communication. The data transmission controller 4-2 is similar in structure to the data transmission controller 1-2 in the first embodiment.

In the following, description will be made of data transfer from the transmitting terminal 5 to the receiving terminal 6.

The transmission data generated by the data generator 5-4 of the transmitting terminal 5 are packetized by the data transmission controller 5-2 into transmission packets. The transmission packets are delivered to the network and received by the data reception controller 4-14 of the session relay 4, not by the data reception controller 6-14 of the receiving terminal 6. Supplied with the transmission packets, the data reception controller 4-14 sends ACK packets back to the session relay 4. Simultaneously, the data reception controller 4-14 extracts the data from the transmission packets and supplies the data to the data transmission controller 4-2. The data transmission controller 4-2 carries out packet output processing similar to that in the first embodiment. Finally, the data reception controller 6-14 of the receiving terminal 6 receives these packets.

In this embodiment, it is possible to carry out communication between the transmitting terminal and the session relay by an existing TCP method and to carry out communication between the session relay and the receiving terminal by the high-throughput TCP method according to this invention. Therefore, even if a line or channel between the session relay and the receiving terminal is low in quality, it is possible to realize high-throughput TCP communication between the transmitting and the receiving terminals.

In this embodiment, the transmitting terminal and the receiving terminal are operable in accordance with the existing TCP method and need not be charged. Thus, it is possible to improve the throughput by introducing the session relay without modifying the existing terminals.

While this invention has thus far been described in conjunction with the preferred embodiments thereof, it will be readily possible for those skilled in the art to put this invention into practice in various other manners without departing from the scope of this invention.

What is claimed is:

1. A communication system for transmitting and receiving data between a plurality of terminals via a network through a session relay for relaying communication between the terminals, wherein:
   each of the terminals or the session relay comprises:
   a measuring portion for measuring a one-way or a round-trip delay time in the network,
   a determining portion for determining a threshold delay time at which network congestion is judged, and
   an estimating portion for estimating, with reference to a delay time upon detection of packet loss and the threshold delay time, the possibility that the packet loss is due to congestion,
   a congestion window being changed with reference to the possibility upon detection of the packet loss,
   wherein:
   the estimating portion estimates that the packet loss is due to congestion when the delay time upon detection of the packet loss is greater than the threshold delay time, the estimating portion estimating a smaller possibility that the packet loss is due to congestion as the delay time upon detection of the packet loss is smaller below the threshold delay time.

2. The communication system claimed in claim 1, wherein:
   the determining portion for determining the threshold delay time at which network congestion is judged measures the delay time upon detection of packet loss and determines the threshold delay time by the use of statistics of previously measured delay times.

3. The communication system claimed in claim 1, wherein:
   the determining portion for determining the threshold delay time at which network congestion is judged measures the delay time upon detection of packet loss and determines the threshold delay time by the use of an average of previously measured delay times.

4. The communication system claimed in claim 1, wherein:
   the determining portion for determining the threshold delay time at which network congestion is judged measures the delay time upon detection of packet loss, prepares delay time distribution, and determines as the threshold delay time a particular delay time having a highest density.

5. The communication system claimed in claim 1, wherein:
   the communication system has a measuring portion for measuring a channel utilization rate, the congestion window being increased upon detection of packet loss if the channel utilization rate thus measured is low.

6. The communication system as claimed in claim 5, wherein:
   the measuring portion for measuring the channel utilization rate judges that the channel utilization rate is low if the delay time is short and judges that the channel utilization rate is higher as the delay time approaches the threshold delay time.

7. The communication system claimed in claim 5, wherein:
   the communication system has a measuring portion for measuring a channel bandwidth and means for measuring a used bandwidth used by a connection, the congestion window being increased with reference to the channel bandwidth and the used bandwidth if the utilization rate is low, the congestion window being not increased if the utilization rate is high.

8. The communication system as claimed in claim 1, wherein:

the communication system has a bandwidth measuring portion for measuring a used bandwidth of a connection, the delay time in the network being estimated by the used bandwidth and the value of the congestion window.

9. A communication system for transmitting and receiving data between a plurality of terminals via a network through a session relay for relaying communication between the terminals, wherein:

each of the terminals or the session relay comprises:

a measuring portion for measuring a one-way or a round-trip delay time in the network, a determining portion for determining a threshold delay time at which network congestion is judged, and an estimating portion for estimating, with reference to a delay time upon detection of packet loss and the threshold delay time, the possibility that the packet loss is due to congestion, wherein:

a congestion window is changed upon detection of packet loss in a manner such that the congestion window is halved if it is estimated that the packet loss is due to congestion and that the reduction amount of the congestion window is smaller as the possibility that the packet loss is due to congestion is estimated smaller, the congestion window being unchanged if it is estimated that the packet loss is not due to congestion.

* * * * *